United States Patent [19]

Kashihara et al.

[11] Patent Number: 4,469,374
[45] Date of Patent: Sep. 4, 1984

[54] AUTOMOTIVE SEAT

[75] Inventors: Jo. Kashihara, Nakaune Okayama; Etsusuke Oda, Futago Kurashiki, both of Japan

[73] Assignee: Namba Press Works Co., Ltd., Okayamaken, Japan

[21] Appl. No.: 323,662

[22] Filed: Nov. 20, 1981

[51] Int. Cl.³ .......................... A47C 7/46; A47C 3/00
[52] U.S. Cl. ...................................... 297/284; 297/362
[58] Field of Search .................................. 297/284, 362

[56] References Cited

U.S. PATENT DOCUMENTS

| | | |
|---|---|---|
| 2,685,327 | 8/1954 | Pitman . |
| 3,121,592 | 2/1964 | Anderson . |
| 3,137,524 | 6/1964 | Chancellor, Jr. . |
| 3,288,525 | 11/1966 | Cerf . |
| 3,807,794 | 4/1974 | Beyer ................................ 297/284 |
| 3,880,463 | 4/1975 | Shephard et al. . |
| 3,890,000 | 6/1975 | Easley . |
| 3,929,374 | 12/1975 | Hogan et al. . |
| 3,938,858 | 2/1976 | Drabert et al. . |
| 3,948,558 | 4/1976 | Obermeier et al. . |
| 4,019,777 | 4/1977 | Hayashi . |
| 4,148,522 | 4/1979 | Sakurada et al. . |
| 4,155,592 | 5/1979 | Tsuda et al. . |
| 4,156,544 | 5/1979 | Swenson et al. . |
| 4,182,533 | 1/1980 | Arndt et al. ........................ 297/284 |
| 4,239,282 | 12/1980 | White . |
| 4,295,681 | 10/1981 | Gregory ............................. 297/284 |
| 4,313,637 | 2/1982 | Barley ................................ 297/284 |
| 4,313,640 | 2/1982 | Trotman et al. . |

FOREIGN PATENT DOCUMENTS

| | | | |
|---|---|---|---|
| 26668 | 4/1981 | European Pat. Off. ............ | 297/284 |
| 140021 | 2/1980 | Fed. Rep. of Germany ...... | 297/284 |
| 1235051 | 5/1960 | France ................................ | 297/362 |
| 27124 | 3/1977 | Japan .................................. | 297/284 |
| 943124 | 11/1963 | United Kingdom ................ | 297/284 |
| 2055711 | 3/1981 | United Kingdom . | |

Primary Examiner—William E. Lyddane
Assistant Examiner—Peter R. Brown
Attorney, Agent, or Firm—Harness, Dickey & Pierce

[57] ABSTRACT

An automotive or similar type vehicle seat comprising a seat back having an adjustable central portion which may be selectively adjustably positioned to minimize driver fatigue. The adjustable area is actuatable upon rotation of an adjustment knob which controls rotation of a shaft which is connected via suitable linkages to a pivotal support mechanism for pivotably adjusting the central portion of the seat back.

6 Claims, 4 Drawing Figures

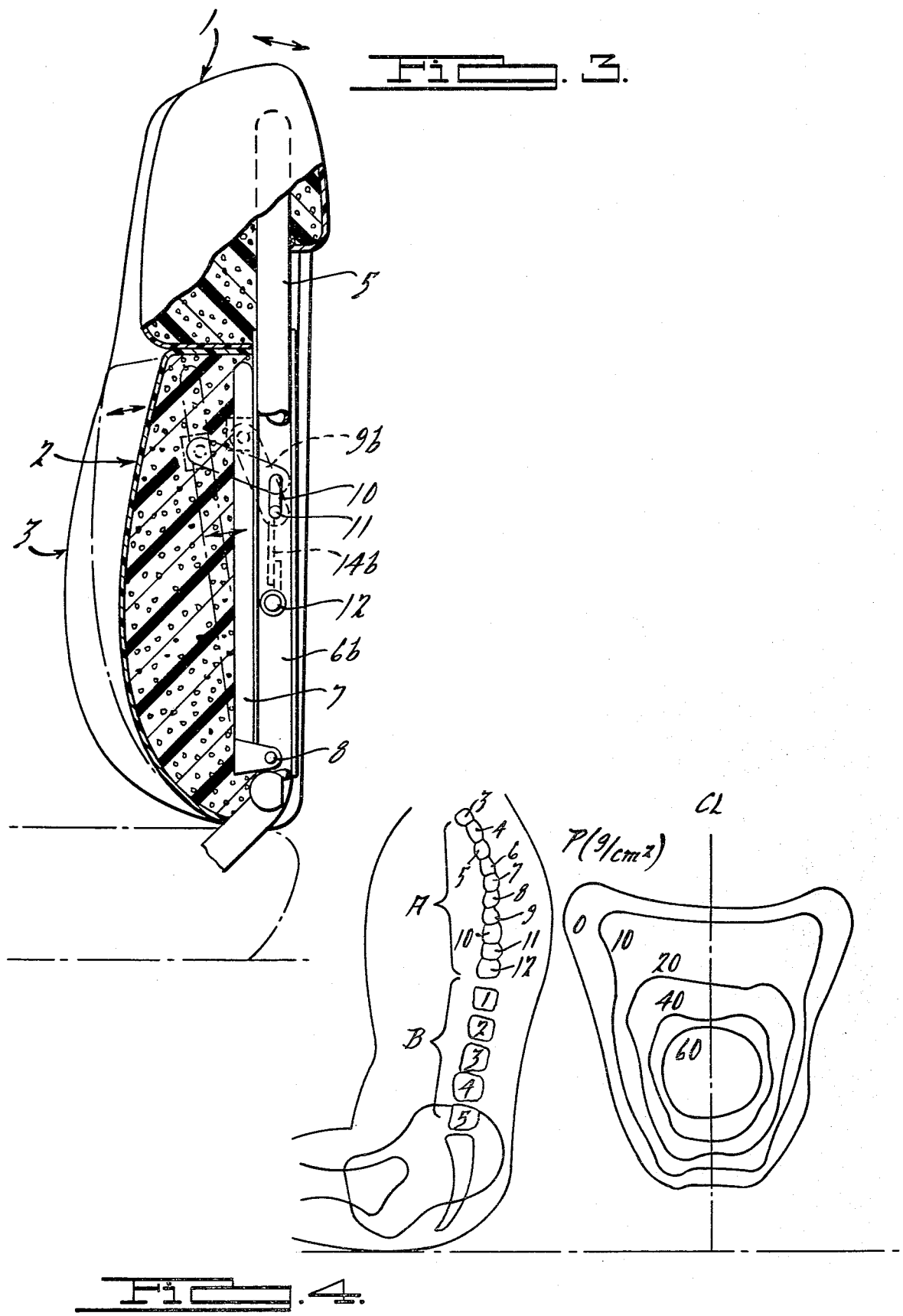

AUTOMOTIVE SEAT

BACKGROUND OF THE INVENTION

This invention relates in general to vehicular seats which helps the driver and/or passenger feel more comfort and less fatigue. In particular, this invention relates to automotive seats with a mobile seat back which is adjustable to the contours of the driver's body, and which thereby reduces fatigue of the driver and results in a more comfortable ride.

In general, automotive seats have been designed in such ways that minimize the fatigue of the driver during driving, i.e., the seat backs have been designed with optimum stress-strain relationship. It has been reported that positioning a vehicle seat back in the position shown in FIG. 4 such that the maximum stress range (the stress of 60 g/cm² range in the Figure) is located at the second and third lumbar vertebra gives a driver minimum fatigue and maximum comfort during driving. However, such seat back designs fit the body contour of an average driver, and depending upon body contours of individual drivers and the reclining angle of the particular seat, deviation from the optimum stress distribution takes place, thus increasing fatigue and discomfort of the driver. In addition, even if the driver sits in the optimum seating configuration, sitting in the same position for prolonged time causes constant stress on the same parts of the body, which often leads to fatigue and discomfort of the driver.

BRIEF SUMMARY OF THE INVENTION

It is a general objective of the invention to provide a new and improved vehicular seat which overcomes or reduces the deficiencies of conventional vehicular seats described above. By incorporating an adjustable, mobile seat back in a vehicular seat, a driver can freely select the seat back position and adjust the seat back to his own body contours.

The overall construction and design of the vehicular seat of this invention is shown in FIG. 1. The seat back in the invention is made up of two parts, namely, one part supported by the main seat back frame and being relatively fixed, and the other part being mobile with its movement controlled by an adjustment knob. The separation of the seat back is made at the upper region of the high body stress distribution (FIG. 4). When the upper part of the mobile seat back comes forward toward the back of the driver (FIG. 1), the maximum stress range of lumbar vertebra goes upward, and when the upper part of the mobile seat back goes backward away from the back of the driver, the maximum stress range goes downward. Consequently, the deviation from the optimum stress ranges due to the difference in body contours of drivers can be corrected by adjusting the mobile seat back.

Another objective is to enable the driver to adjust or correct the body stress distribution to specific seating positions. When driving congested streets or when driving with the seat back angle of a reclining seat adjusted so that it is nearly verticle or only slightly displaced from that position, the body stress becomes concentrated at upper part of vertebra, thus deviating from the optimum stress distribution.

Another object is to provide appropriate hold effects on the driver regardless of his size and contours of body. As shown in FIG. 2, both sides of the seat bolster are made thicker in order to support the stress parallel to the seat back. The contact stress between the body and bolster is too great for large drivers, while the contact stress cannot be achieved for small drivers, resulting in insufficient hold effect. The mobile seat back of this invention enables a large driver to achieve adequate hold effect by moving backward the upper part of the mobile seat back and also enables a small driver to achieve the adequate hold effect by moving forward the upper part of the mobile seat back.

Another object is to provide a driver during long distance driving with more comfort and less fatigue by enabling occasional adjusting and readjusting of the mobile seat back, which avoids the constant stress on the same part of the body.

Another object is to provide a driver suffering fatigue due to long hours of driving with corrective meatures via means for adjusting seating positions; for example, by moving the upper part of the mobile seat between back and forward, the driver during long hours of driving can adjust the body stress on his back, thus contributing to reduction of fatigue.

The objects described above can be achieved with the seat in the invention. The driver in this seat can choose seating position and adjust the mobile seat back in order to reduce fatigue during driving.

BRIEF DESCRIPTION OF THE DRAWING

FIG. 3 is a longitudinal cross-sectional view of the seat back taken along the line of body contour of a driver; and FIG. 4 is a schemmatic and graphic body stress distribution-fatigue analysis.

DETAILED DESCRIPTION OF THE PREFERRED EMBODIMENTS

Figure 1:
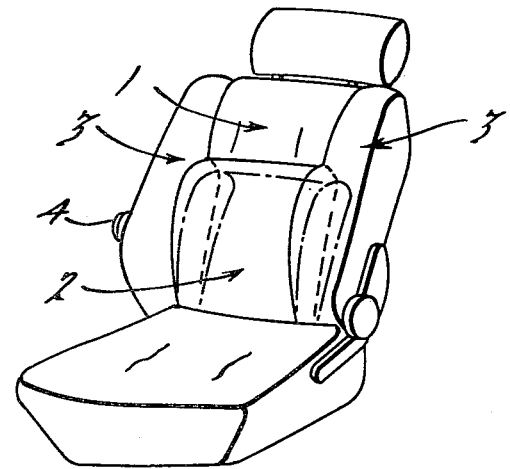
FIG. 1 is an elevated perspective view of a seat with the mobile seat back of the present invention.

From the drawings, it will be seen that the automotive seat of the invention has a seat back consisting of two primary parts, namely, the upper part 1 and the lower mobile part 2. Bolsters 3 are fixed to the upper stationary part 1. In order to move the mobile part of the seat back, a knob or switch is installed, as shown in FIG. 1.

FIG. 4 shows the body stress distribution which results in minimum fatigue. Body stress distribution is dependent upon the contours of individual driver's body, and therefore, in order to achieve the body stress ranges (the areas of 40 g/cm² or more in FIG. 4) should be separated from whole seat back and should be made to move independently and continuously so that the driver can achieve the optimum body stress distribution with symmetry in respect to the back seat.

Figure 2:
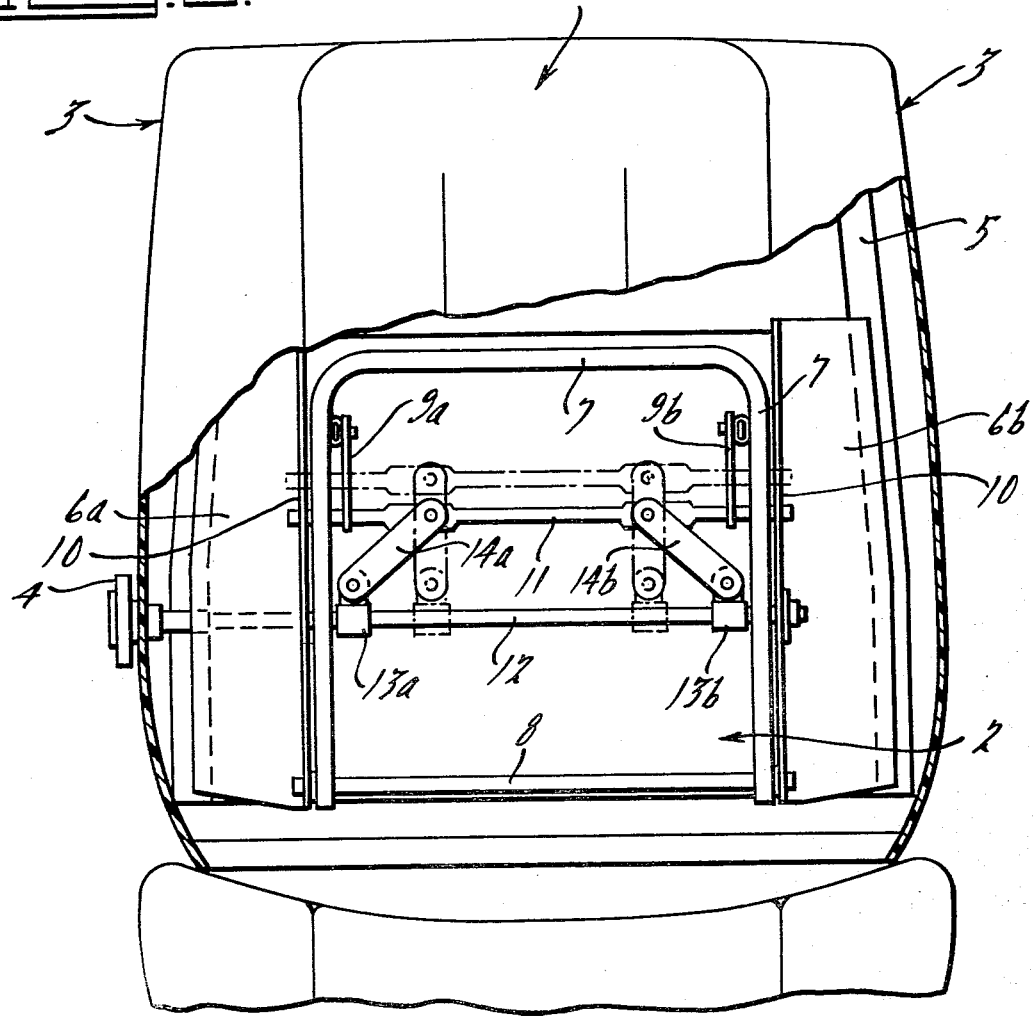
FIG. 2 is a partially broken-away view of the seat of the present invention.

The seat back of the invention is constructed, as shown in FIGS. 2 and 3. Tubular frame 5 supports the whole seat back and bolster frames 6a and 6b with elastomeric foam, such as polyurethane foam, and constitutes the upper stationary seat back part. The lower, mobile part of the seat back 3 is constructed in such a way that the driver can achieve the optimum stress distribution by adjusting the angle of the lower, mobile part of the seat back. Both ends of the frames of the lower, mobile part of the seat back are connected to bolster frames 6a and 6b through supporting arms 8 and the upper section of the frame is connected by joint levers 9a and 9b. The joint levers 9a and 9b, which are connected to the mobile axle 11 at their lower ends, are capable of rotating as the axis 11 moves up and down in the long holes 10 which are formed in the bolster frames 6a and 6b. When the axle 11 moves upward, the mobile seat back frame 7 starts to rotate about the axle 8 by the forces of the joint levers 9a and 9b, whereby the upper part of the mobile seat back moves forward to the driver's back. On the other hand, when the axle 11 moves downward, the mobile frame 7 starts to rotate backward about the axle 8. In order to move the axle 11 up and down, the adjusting axle 12 is introduced at the back of the mobile seat back frame 7. The both ends of the adjusting axle 12 are supported by the holes in the side wall of bolster frames 6a and 6b. The adjusting axle 12 has reverse threads at its opposite ends, and thread holders 13a and 13b have threads with the same pitch as the threads on the axle 12. Rods 14a and 14b connect the thread holders 13a and 13b and the axle 11. An adjusting knob is attached at the end of the adjusting axle 12. By rotating the adjusting knob 4, the thread holders 13a and 13b move horizontally and this movement causes the up-down movement of the axle 11 through the joint rods 14a and 14b. Thus, the driver can move the mobile seat back by rotating the adjusting knob 14.

As shown in FIGS. 2 and 3, the mechanism for moving the mobile seat back is effectively contained in narrow space in the seat; yet this mechanism exhibits strong enough force to move the mobile seat back by overcoming the stress caused by the driver's back. Other types of mechanisms for adjusting the mobile seat back in the invention such as gears, cams, crankshaft or electronic motors can also be conceivable within the scope of the invention.

I claim:

1. In a vehicle seat of the type having a seat portion, a seat back portion including a bolster frame, and a moveable lumbar support pad in the seat back portion, an improved lumbar support assembly comprising:
   a support frame pivotable about a generally horizontal axis about the lower portion of said support frame,
   a threaded axle mounted for rotation to the bolster frame extending along a generally horizontal axis,
   at least one thread holder engaging said threaded axle,
   at least one joint rod having a first and second end, said first end pivotably fixed to said thread holder,
   a second axle pivotably attached to said joint rod second end, said second axle engaging at least one elongated slot formed by the bolster frame,
   at least one joint lever having a first and second end, said first end pivotably attached to said second axle, said second end pivotably attached to said support frame whereby rotation of said threaded axle causes said thread holder to move along said threaded axle thus causing
   the position of said second axle within said slot to change thereby causing said joint levers to effect changes in the position of said support frame.

2. The vehicle seat according to claim 1 wherein a pair of said thread holders are pivotably fixed to a pair of said joint rods.

3. The vehicle seat according to claim 2 wherein a pair of said joint levers are pivotably attached to both said second axle and said support frame.

4. The vehicle seat according to claim 2 wherein said threaded axle includes first and second threaded portions, said portions having opposing thread direction such that upon rotation of said threaded axle, said thread holders move either toward or away from one another along said threaded axle.

5. The vehicle seat according to claim 1 wherein a pair of said slots are formed by said bolster frame.

6. The vehicle seat according to claim 5 wherein said slots extend in a substantially vertical direction.

* * * * *